July 15, 1947. R. K. HARTLEY 2,424,165
TRACTOR-MOUNTED HAY RAKE AND STACKER
Filed Aug. 7, 1945 3 Sheets-Sheet 1
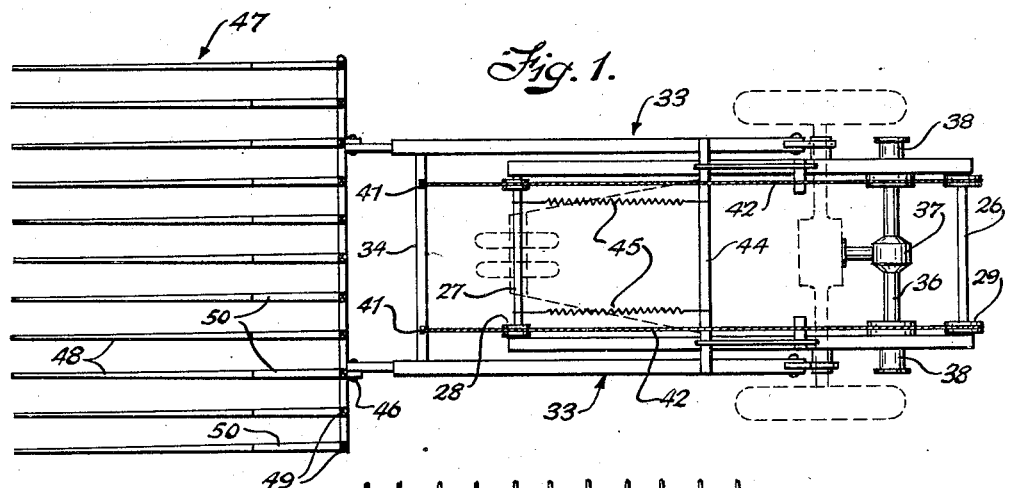
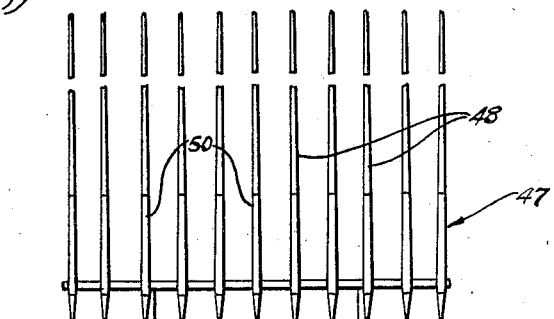
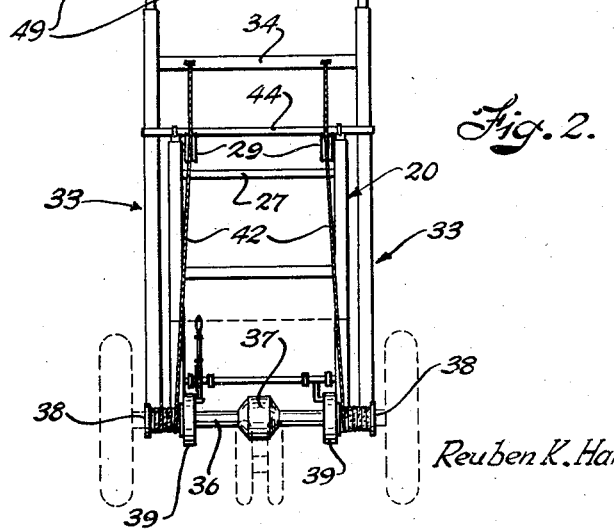
Inventor
Reuben K. Hartley.
By Clarence A. O'Brien
and Harvey B. Jacobson
Attorneys

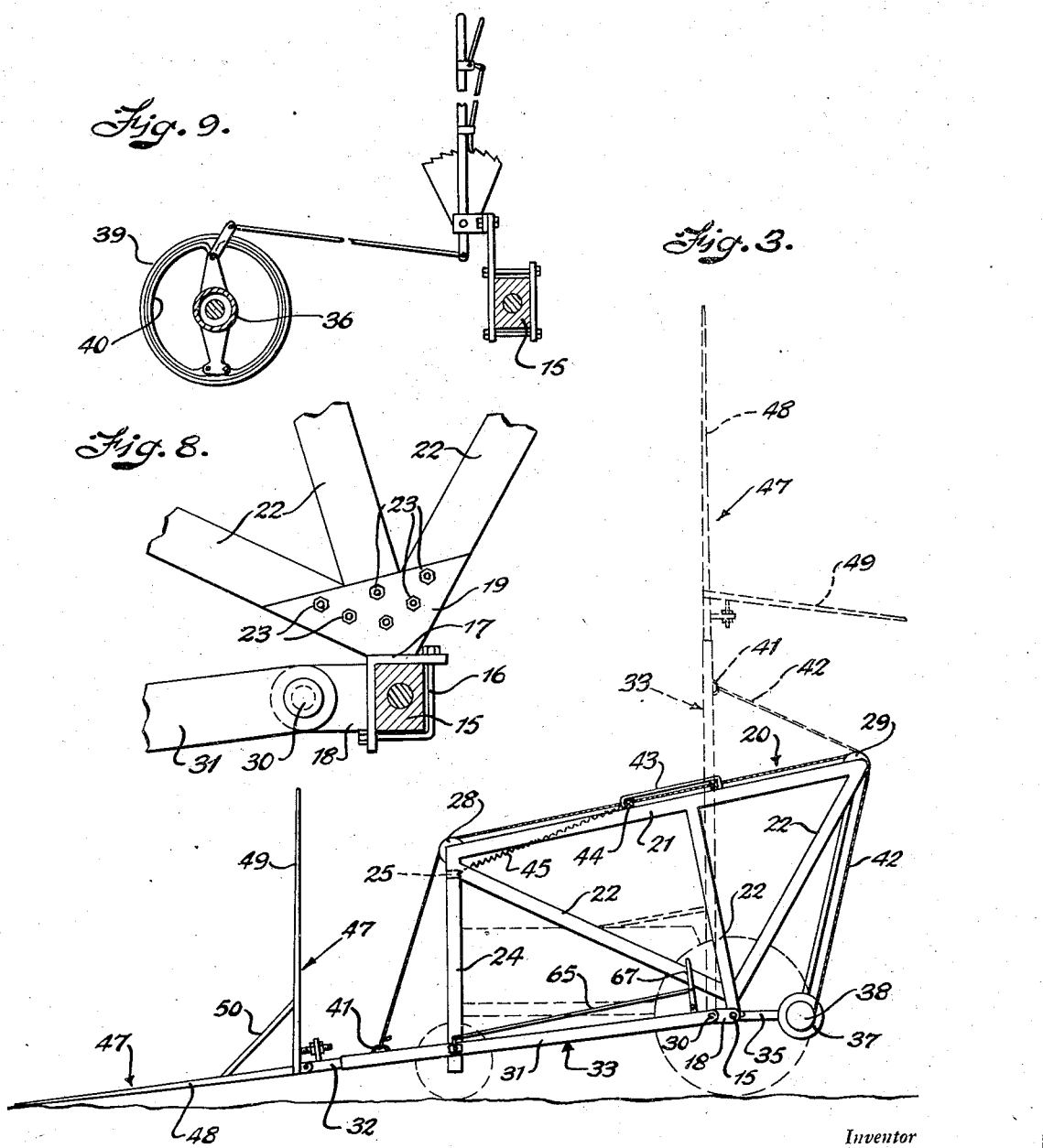

July 15, 1947.  R. K. HARTLEY  2,424,165
TRACTOR-MOUNTED HAY RAKE AND STACKER
Filed Aug. 7, 1945  3 Sheets-Sheet 3
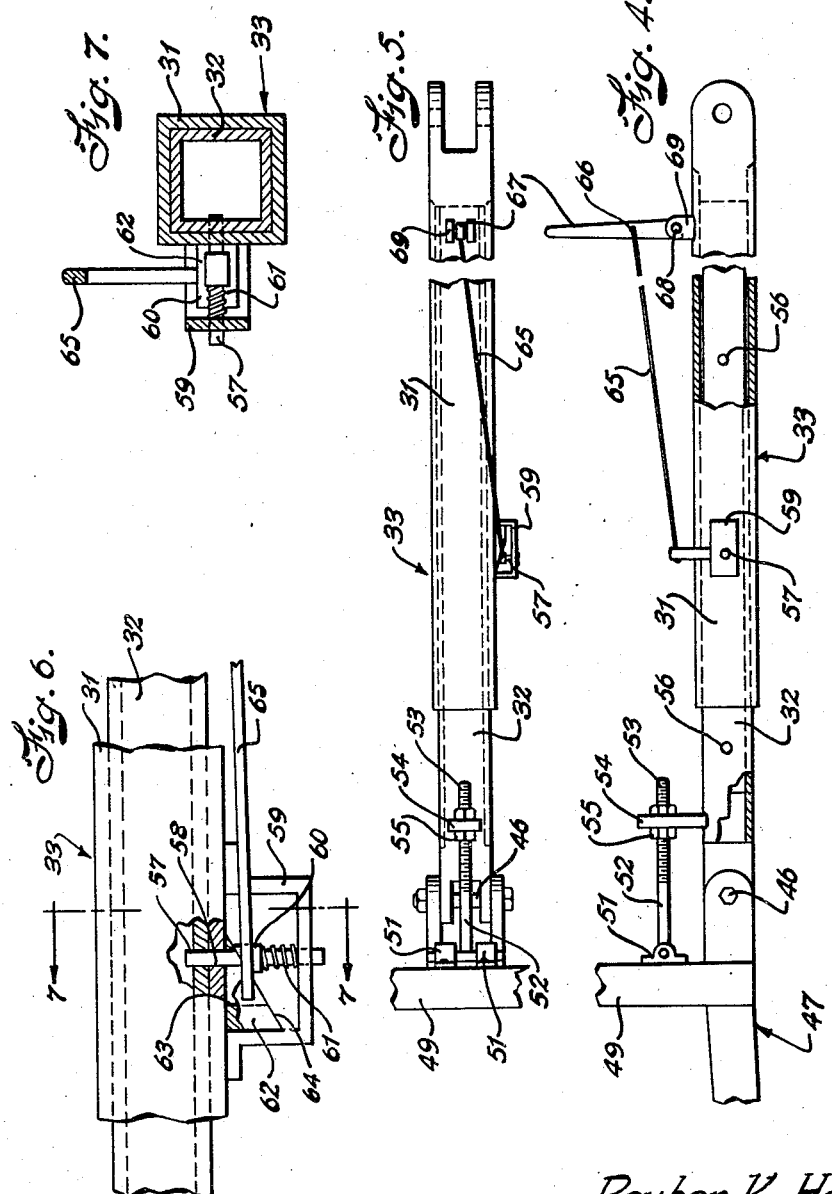
Inventor
Reuben K. Hartley.
By Clarence A. O'Brien
and Harvey B. Jacobson
Attorneys Patented July 15, 1947

2,424,165

UNITED STATES PATENT OFFICE 2,424,165

TRACTOR-MOUNTED HAY RAKE AND STACKER

Reuben K. Hartley, Hamilton, Mo.

Application August 7, 1945, Serial No. 609,351

1 Claim. (Cl. 214—142)

This invention relates to improvements in a hay rake and stacker adapted for attachment to a farm tractor, and has for its primary object to facilitate the collection and stacking of hay particularly during the harvesting season.

Another object is to readily equip a farm tractor of ordinary construction to perform the service of a hay rake and a hay stacker to thus increase its utility.

The above and other objects may be attained by employing this invention which embodies among its features a pair of telescopic arms pivotally mounted near the rear end of a tractor to swing in a substantially 90° arc from a horizontal position or a position slightly below the horizontal into a substantially vertical position, a hay rake carried by the free ends of the arms and adapted to move in unison therewith so that as the tractor is driven, the rake may be lowered to hay-collecting or gathering position, and elevated for carrying the gathered hay, and finally to a vertical position above the tractor for discharging the contents of the rake and creating a stack or pile at a given point in a field, or loft.

Other features include means driven by the power take-off of the tractor for controlling the movements of the telescopic arms, means for locking the arms in various positions of elevation, and yielding means serving as a bumper to retard the movement of the arms as they approach the vertical.

Still other features include means for adjusting the angular position of the hay rake with relation to the arms.

In the drawings:

Figure 1 is a top plan view of a hay rake and stacker attachment embodying the features of this invention and showing the same mounted on a tractor indicated by the dotted lines, Figure 2 is a rear end view of Figure 1, Figure 3 is a side view of Figure 1 illustrating the rake and rake-carrying arms in elevated position in dotted lines, Figure 4 is an enlarged side view, partially in section, showing one of the telescopic arms with the rake attached to the forward end thereof, Figure 5 is a top plan view of Figure 4, Figure 6 is an enlarged detail fragmentary plan view of the latch employed for holding the telescopic arms in proper adjusted position, Figure 7 is a transverse sectional view taken on the line 7—7 of Figure 6, Figure 8 is an enlarged detail fragmentary side view of the rear end of the supporting frame for the arms, and Figure 9 is an enlarged detail view of the brake employed on the arm-elevating drums.

Referring to the drawings in detail, clamped to the axle 15 of a suitable tractor adjacent opposite ends, as by suitable L-shaped bolts 16, is an angle bracket 17 carrying a forwardly projecting arm 18 and an upwardly extending gusset plate 19.

Supported by the gusset plates 19 is a superstructure designated generally 20 which comprises a pair of longitudinally extending bars 21 supported on standards 22, the lower ends of which are attached to the gusset plate 19, as by bolts 23. A pair of spaced columns 24 rises from a suitable support (not shown) adjacent the forward end of the tractor, and these columns are attached at their upper ends to the side rails 21 above described. Extending transversely between the standards 24 near their junction with the side rails 21 is a transversely extending tie bar 25 and mounted for rotation in suitable bearings adjacent the opposite ends of the side rails 21 is a shaft 26 which cooperates with the tire bar 25 in holding the side rails 21 in spaced parallel relation. Mounted on a transversely extending shaft 27 at the junction of the forward ends of the rails and the upper ends of the standards are pulleys 28 and mounted on the shaft 26 at the rear ends of the rails 21 are pulleys 29, the purpose of which will more fully hereinafter appear.

Pivotally mounted, as at 30, adjacent the forward ends of the brackets 18 are tubular arms 31 into the free ends of which are fitted tubular members 32 forming in cooperation with the members 31 telescopic rake-supporting arms designated generally 33. The members 31 are connected together near their free ends by a tie bar 34 which is of a length to cooperate with the distance between the rear ends of the members 31 to hold them in spaced parallel relation on opposite sides of the tractor. Mounted on extensions 35 which project rearwardly from the axle 15 is an axle housing 36 carrying intermediate its ends a gear housing 37 in which suitable driving gears for a drive shaft contained within the housing 36 are mounted. The ends of the drive shaft project beyond the ends of the housing 36 and carry winding drums 38, each of which is provided with a brake drum 39 which is adapted to cooperate with a brake shoe 40 mounted for manual control, as illustrated in Figure 9, on the housing 36. Attached to suitable eyes 41 carried by the tie bar 34 and extending up over the pulleys 28 and 29 is a pair of cables 42 which, as illustrated in Figure 2, are wound on the drums 38. It will thus be seen that as the shaft within the housing 36 is rotated, the cables 42 will either raise or lower the forward ends of the arms 33 about their pivots 30.

Carried by each of the rails 21 on its upper side and arranged in spaced parallel relation thereto is a guide rail 43, and slidably mounted in the space between the guide rails 43 and the upper sides of the side rails 21 is a transversely extending buffer bar 44.

As illustrated in Figures 1 and 2, the ends of the buffer bar extends outwardly beyond the side edges of the superstructure 20 and into the path of the arms 33 so that as the arms move into a vertical position, they will encounter the buffer bar and cause it to move beneath the guides toward the rear end of the superstructure 20 until the arms 33 have assumed a vertical position, at which time further movement of the buffer bar and arms is arrested. Attached to the buffer bar is a pair of retractile coil springs 45, the forward ends of each of which are attached to the transversely extending tie bar 25 so that the buffer bar is normally urged toward the forward end of the superstructure 20 and yieldingly held in this position when the arms 33 are lowered.

Pivotally attached, as at 46, to the tubular members 32 at their extreme forward ends is a rake designated generally 47 comprising a plurality of gathering tines 48 and supporting tines 49 which extend substantially perpendicular to the tines 48. These tines are held rigidly in proper relation by means of angularly extending tie bars 50 which are attached to the tines near their junction. Secured to certain of the tines 49 is a pair of spaced brackets 51 in which the head of a T-bolt 52 is pivotally mounted. The shank of this T-bolt is externally screw-threaded, as at 53, and projects through an ear 54 which extends upwardly from the tubular member 32 near its extreme forward end to which the rake 47 is pivoted. Adjusting nuts 55 are threaded on the threads 53 on opposite sides of the ear 54 so that the bolt 52 may be adjusted longitudinally with relation to the ear in order to vary the position of the rake 47 with relation to the telescopic arms 33.

Formed at spaced intervals in the inner member 32 of each arm 33 is a longitudinal series of spaced openings 56 which are adapted to receive a latch bolt 57 (Fig. 6) which is carried in aligning apertures 58 formed in the side wall of the tubular member 31 and a U-shaped bracket 59 carried thereby. The bolt 57 is provided intermediate its ends with a fixed collar 60 against which one end of a compression coil spring 61 is adapted to bear. The opposite end of the coil spring 61 bears against the inner face of the bracket 59 so as to urge the bolt inwardly, as shown in Figure 6. In order to release the bolt, I provide a longitudinally slidable wedge block 62 having a longitudinal slot 63 for the reception of the bolt and an inclined outer face 64 for engagement with the collar 60 on the side opposite that engaged by the spring 61. It will thus be seen that as the wedge block 62 is moved longitudinally, the bolt 57 will be either projected or retracted according to the direction of movement of the block. Welded or otherwise attached to the wedge block 62 is a link 65 which extends rearwardly of its respective telescopic arm 33 and is attached, as at 66, to a lever 67 pivoted at 68 between a pair of ears 69 carried by the tubular member 31 near the end which is pivoted to the bracket 18. It will thus be seen that upon moving the lever 67, the latch bolt 57 of each of the telescopic arms 33 will be either withdrawn or projected so that adjustment of the telescopic arms may be achieved. It is understood, of course, that the pivot 68 extends transversely across the machine so as to operate both latch bolts in unison.

In operation, the device is mounted on a tractor, as previously described, and upon driving the tractor forward with the arms 33 in lowered position, the rake 47 may be caused to gather and collect loose hay or any similar material until the material piles up against the tines 49 to a sufficient height. The drums 38 are then operated to wind the cable 40 so as to elevate the rake 47 to the desired position, after which the tractor may be driven to any suitable place to which the contents of the rake are to be transported. Having maneuvered the tractor into proper position for the discharge of the contents of the rake, the arms 33 are further elevated by rotation of the drums 38 to move them into a vertical position, as shown in Figure 3. As the arms approach the vertical position, they will encounter the buffer bar 44 which will be caused to move backwardly against the influence of the springs 45 into position to discharge the contents of the rake. In order that the rake may be adjusted to discharge its contents at the desired height, the lever 67 may be manipulated to withdraw the latch pins 57 against the influence of the springs 61 so as to permit the tubular member 32 of each tubular member 31 to be moved to the desired position when the latch is again released. It will thus be seen that when the rake is moved to vertical position, as illustrated in Figure 3, the height at which the discharge takes place can be readily varied. It is also obvious that by adjusting the adjusting nuts 55 on the shank of the bolt 52, the angle of attack of the rake 48 may be varied to suit different conditions.

While in the foregoing there has been shown and described the preferred embodiment of this invention, it is to be understood that minor changes in the details of construction, combination and arrangement of parts may be resorted to without departing from the spirit and scope of the invention as claimed.

I claim:

A tractor attachment which includes a pair of telescopic arms pivoted to a tractor near its rear end, a hay rake carried between the forward ends of the arms, means to adjust the angular position of the rake relative to the arms, a side frame mounted on the tractor adjacent each arm, a pulley at the upper forward corner of each side frame, a pulley at the upper rear corner of each side frame, a cable attached to each arm and extending over the pulleys on the side frame adjacent its respective arm, a winding drum for each cable the lower rear corner of each frame, means establishing driving connection between the power plant of the tractor and the winding drums, a cross bar slidably mounted on the upper edges of the side frames with its opposite ends intersecting the paths of movement of the arms and springs attached to the bar and to the side frames yieldingly to hold the bar in a forward position whereby when the arms approach a vertical position under the influence of the cables the springs will absorb the energy and retard the movement of the arms.

REUBEN K. HARTLEY.

REFERENCES CITED

The following references are of record in the file of this patent:

UNITED STATES PATENTS

| Number | Name | Date |
|---|---|---|
| 925,816 | Long | June 22, 1909 |
| 1,071,511 | Daniels | Aug. 26, 1913 |
| 1,129,646 | Cope | Feb. 23, 1915 |
| 1,190,271 | Doody | July 11, 1916 |
| 1,368,121 | Cooper | Feb. 8, 1921 |
| 1,435,879 | Sell | Nov. 14, 1922 |
| 1,791,979 | Sharp | Feb. 10, 1931 |
| 2,322,487 | Toftey | June 22, 1943 |